United States Patent
Hall et al.

(10) Patent No.: US 9,860,361 B1
(45) Date of Patent: Jan. 2, 2018

(54) WIRELESSLY CONTROLLED INFLATOR

(71) Applicants: David R. Hall, Provo, UT (US);
Jerome Miles, Spanish Fork, UT (US);
Davido Hyer, Spanish Fork, UT (US);
Jedediah Knight, Provo, UT (US)

(72) Inventors: David R. Hall, Provo, UT (US);
Jerome Miles, Spanish Fork, UT (US);
Davido Hyer, Spanish Fork, UT (US);
Jedediah Knight, Provo, UT (US)

( * ) Notice: Subject to any disclaimer, the term of this patent is extended or adjusted under 35 U.S.C. 154(b) by 0 days.

(21) Appl. No.: 15/413,905

(22) Filed: Jan. 24, 2017

(51) Int. Cl.
*H04M 3/00* (2006.01)
*H04M 1/725* (2006.01)
*H04W 4/00* (2009.01)

(52) U.S. Cl.
CPC ....... *H04M 1/72533* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 5,709,295 A | * | 1/1998 | Johnson | G07F 17/06 194/350 |
| 6,445,287 B1 | * | 9/2002 | Schofield | B60C 23/0401 340/442 |
| 2007/0237652 A1 | * | 10/2007 | Belanger | B60C 23/04 417/279 |
| 2015/0208725 A1 | * | 7/2015 | Tsai | H05B 1/0244 392/390 |
| 2016/0144676 A1 | * | 5/2016 | Neir | A63B 41/02 137/228 |
| 2017/0130728 A1 | * | 5/2017 | Liu | F04D 27/007 |

* cited by examiner

*Primary Examiner* — Shantell L Heiber

(57) ABSTRACT

A wirelessly controlled inflator is described herein that includes a pump, a hose, a programmable switch, and a wireless transceiver. The hose is fluidically coupled to the pump. The programmable switch is electrically coupled to the pump and stores instructions that, when executed, activate the pump until a desired pressure setting is reached. The wireless transceiver is electrically coupled to the programmable switch and relays pump operation information to the programmable switch. The inflator may be remotely controlled by one or more networked devices, such as directly or via a cloud-based network.

20 Claims, 12 Drawing Sheets

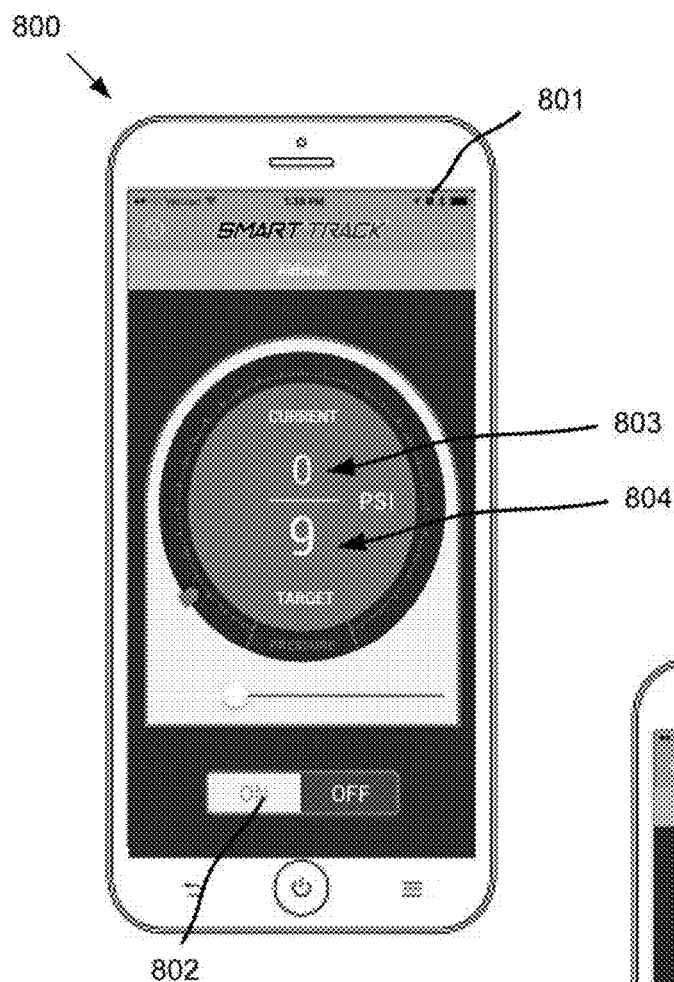
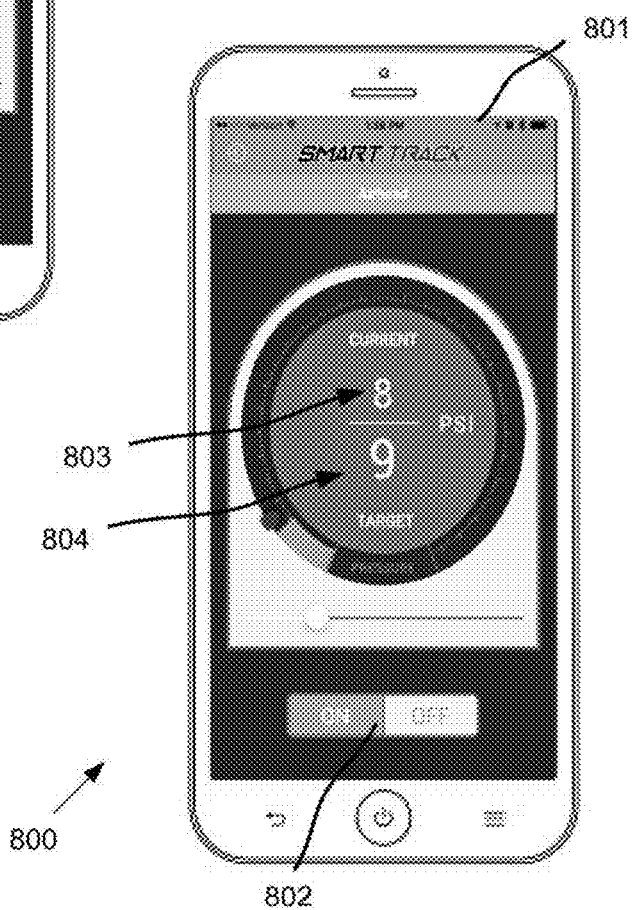
FIG. 8A
FIG. 8B

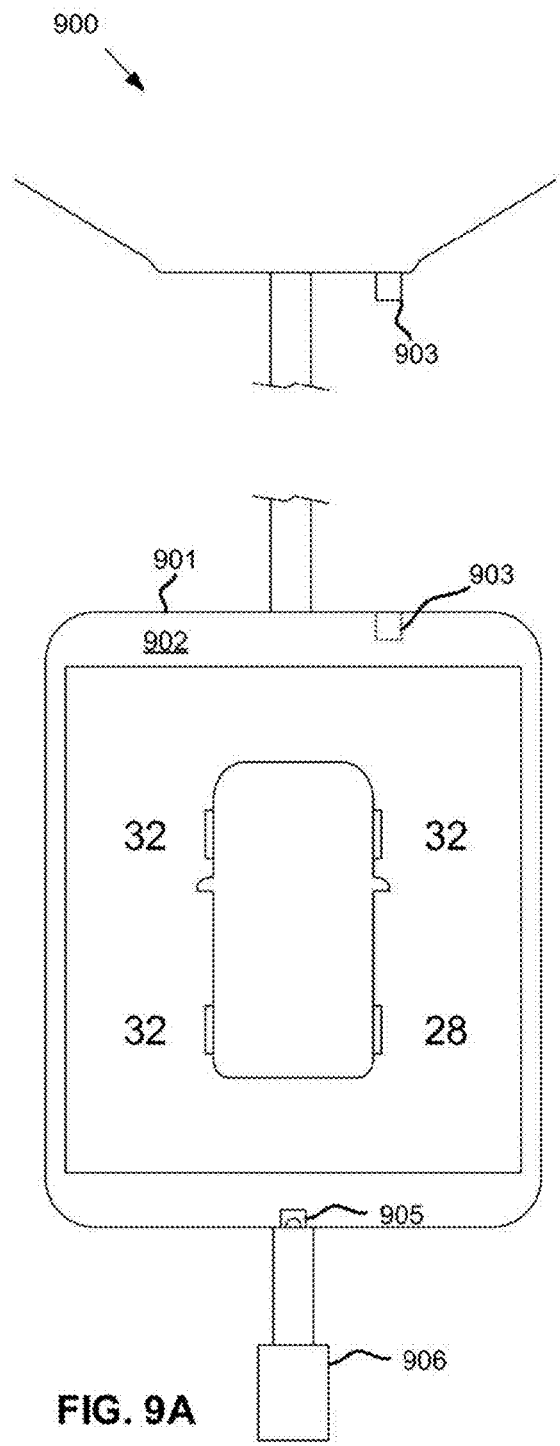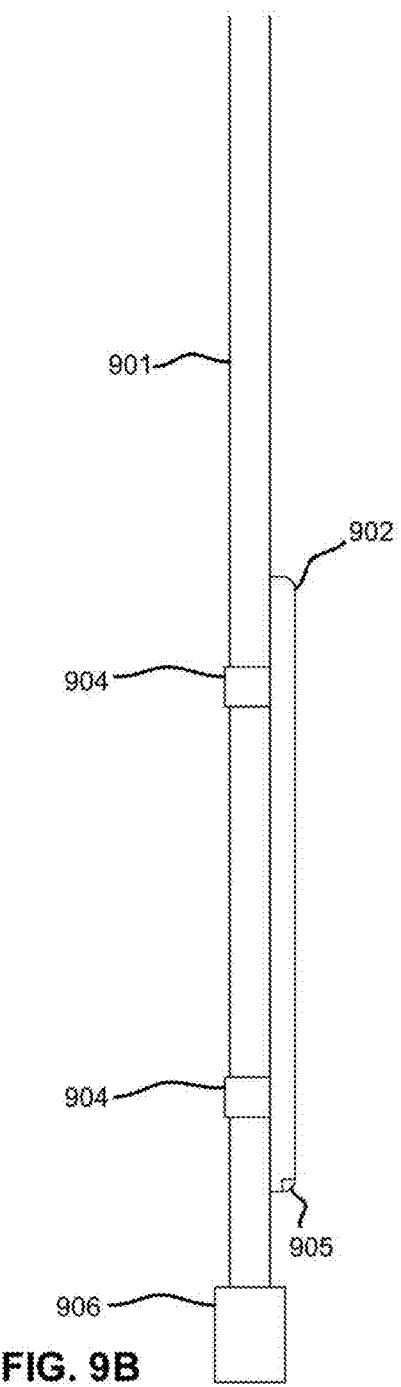
FIG. 9A
FIG. 9B ately reached. Unfortunately, in many cases, the most convenient place for the pump is "out of the way," meaning the user must move between where the pump is located and where the object or tool is located.

WIRELESSLY CONTROLLED INFLATOR

TECHNICAL FIELD

This invention relates generally to the field of inflators, compressors, and pumps.

BACKGROUND

Compressors and inflators are essential tools for at-home workshops and well-equipped home garages. Despite this, little innovation has been seen recently beyond incorporating sometimes-inaccurate digital read-outs. The standard inflator or compressor includes a hose, a coupling mechanism that allows the hose to be coupled to various inflatable objects and/or tools that use compressed air, a pump that is switched on and off locally, and a pressure gauge. Typically, the switch to operate the pump is on the pump or pump housing, thus requiring the pump to be placed where it can be conveniently reached. Unfortunately, in many cases, the most convenient place for the pump is "out of the way," meaning the user must move between where the pump is located and where the object or tool is located.

Some solutions to the inconvenience of locating the pump have been presented. One includes filling a tank with compressed air and having the valve to the tank located at the operable end of the hose. Another includes placing the pump switch at the operable end of the hose and running wiring for the switch along the hose. Both solutions have drawbacks. The tank solution requires finding extra room for a tank, and the switch solution requires a bulkier and less flexible hose. Thus, there is still room for improvement to compressors and inflators.

SUMMARY OF THE INVENTION

A wirelessly controlled inflator is described herein which addresses at least some of the problems discussed above. The wirelessly controlled inflator generally includes a pump, a hose, a programmable switch, and a wireless transceiver. The hose is fluidically coupled to the pump. The programmable switch is electrically coupled to the pump and stores instructions that, when executed, activate the pump until a desired pressure setting is reached. The wireless transceiver is electrically coupled to the programmable switch and relays pump control information to the programmable switch.

The programmable switch and wireless transceiver provide several benefits. First, it allows the inflator to communicate with countless wireless devices, such as a smartphone, or work in congruence with an existing smart home server. Second, this allows a user of the inflator to wirelessly control and monitor the status of the pump, as well as the status of the object connected to the pump. One of skill in the art will recognize other benefits of the inflator, though not mentioned.

BRIEF DESCRIPTION OF THE DRAWINGS

A more particular description of the apparatus briefly described above is made below by reference to specific embodiments. Several embodiments are depicted in drawings included with this application, in which:

FIGS. 8A-B depict views of a smartphone running an application that controls a wirelessly controlled inflator;

FIGS. 9A-B depict two views of and alternative embodiment of a control device for a wirelessly controlled inflator;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
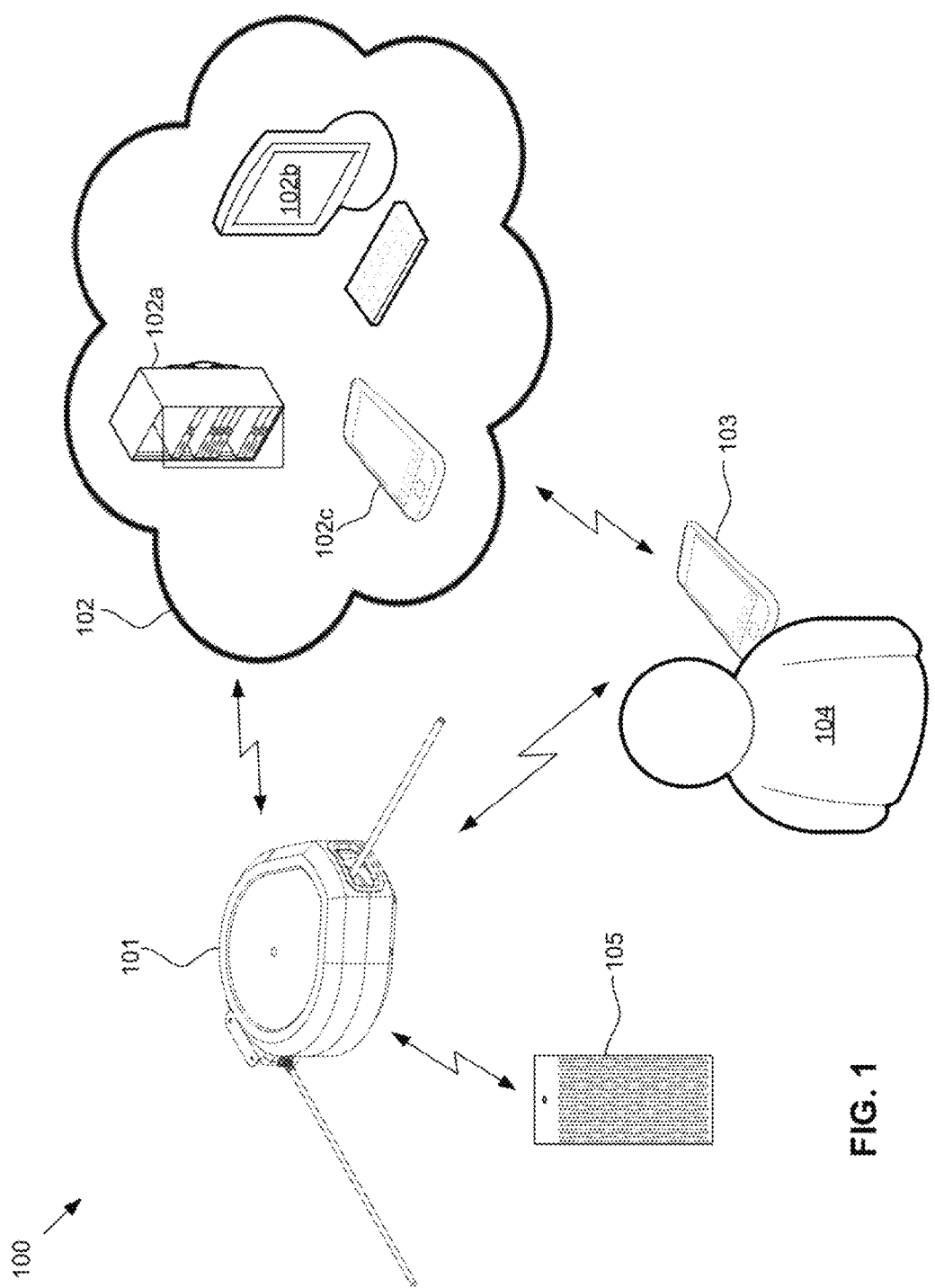
FIG. 1 depicts a system view of a wirelessly controlled inflator according to one embodiment.

FIG. 1 depicts a system view of a wirelessly controlled inflator according to one embodiment. The system 100 includes wirelessly controlled inflator 101, cloud network 102 including network devices 102a,b,c, wireless control device 103 operated by user 104, and networked smart device 105. The inflator wirelessly may communicate with the cloud network, one or more of the cloud network devices, the wireless control device, or the networked smart device via any of a variety of means, including wireless and wired communication means. Such means may include Ethernet, Wi-Fi, Bluetooth, ZigBee, and/or Z-Wave. Other means may include dual modulation on the 902-928 MHz ISM band using FSK and SSFH. Such networks may include local area networks, wireless local area networks, campus area networks, personal area networks, wide area networks, enterprise private networks, metropolitan area networks, storage area networks, and system area networks, among others. Network topologies may include bus, ring, star, and/or mesh topologies.

The wirelessly controlled inflator includes mechanisms for generating and delivering forced air. Such mechanisms are described below in more detail. The inflator may be used to inflate various inflatable objects, including tires, tubes, rafts, toys, balloons, and other inflatable objects. In general, inflatable objects are objects include an internal cavity for holding air and a valve through which the air is forced and which seals the cavity. The inflator may also/alternatively be used to blow air onto an object and/or surface, such as to clean off a work bench or dry paint.

Although the system is depicted with a wirelessly controlled inflator, other wirelessly controlled devices are also envisioned for use with the system. Thus, in some embodiments, the system includes a wirelessly controlled speaker, a wirelessly controlled light, a wirelessly controlled power cord, a wirelessly controlled motorized lifter, a wirelessly controlled vacuum, a wirelessly controlled radio, and/or one or more wirelessly controlled power tools, among others. For specificity, embodiments of the wirelessly controlled inflator are described further below.

The cloud network may include any of a variety of networks incorporating disparate devices remotely located from each other and linked via one or more wired and/or wireless connections. For example, the cloud network may include a single server wired directly or indirectly to a router that wirelessly communicates with a wirelessly controlled device such as the wirelessly controlled inflator. The server may store instructions for operating the wirelessly controlled device, and/or may relay instructions to the wirelessly controlled device from another cloud-networked device. In some embodiments, the cloud network includes a central server and one or more user nodes. A user may provide instructions to the wirelessly controlled device via the user node and the central server, or may bypass the central server and communicate directly with the wirelessly controlled device. For example, in some embodiments, the user node may store communication instructions that route communications directly to the wirelessly controlled device when within the signal range of a given wireless communication means (e.g. Bluetooth, Wi-fi, etc.), and outside that signal range may route communications to the wirelessly controlled device via the server.

The cloud network may include one or more network devices, such as those depicted. The network devices may, in various embodiments, include one or more servers, one or more personal computers, one or more laptop computers, one or more smartphones, and/or one or more tablet computers. Such devices may be real and/or virtual. For example, the cloud network may include a virtual server implemented on a personal computer, a single server blade, or a server cluster. The devices may be organized as client-server, with a hardware device acting as the server, and other hardware devices acting as clients, or the server may be a virtual server formed on several hardware devices.

The wireless control device may include any of a variety of devices capable of wirelessly communicating with the wirelessly controlled device and/or the cloud network. For example, in the depicted embodiment, the wireless control device includes a software application implemented on a touchscreen smartphone. However, in some embodiments, the wireless control device may include a remote control with tactile buttons. Other wireless control devices may include a tablet, a personal computer, a laptop, and/or a special-purpose device designated for controlling the wirelessly controlled device. Examples of such special-purpose devices are described in more detail below.

The networked smart device includes any of a variety of additional devices networked directly and/or indirectly to the wirelessly controlled device. Such networked smart devices may include a wirelessly controlled inflator, a wirelessly controlled speaker, a wirelessly controlled light, a wirelessly controlled power cord, a wirelessly controlled motorized lifter, a wirelessly controlled vacuum, a wirelessly controlled radio, and/or one or more wirelessly controlled power tools, among others. The system may include one or more such networked smart devices. The networked smart device may communicate with the wirelessly controlled device via a wired connection and/or a wireless connection, and may include instructions for operation with the wirelessly controlled device. For example, in one embodiment, the wirelessly controlled device is a wirelessly controlled inflator that is networked to two additional smart devices: a speaker/microphone and an LED light. A user provides a verbal command to begin operating the inflator. The microphone relays the verbal command to the inflator's microprocessor. The microprocessor interprets the verbal command received from the microphone, and performs an operation, such as activating the inflator. The inflator's microprocessor may also include instructions to turn on the LED light when the inflator is activated, and may send a wireless signal to the LED light to turn on as the inflator is activated.

Elements of the system generally described above are described below in more detail. The system described above generally includes a wirelessly controlled device. The wirelessly controlled device may include one or more processors, memory, and a transceiver. The processors and memory may, for example, be embodied in a microprocessor. The microprocessor may include firmware. Additionally or alternatively, the microprocessor may be programmable on-the-fly by an end user. For example, the microprocessor may be incorporated into the wirelessly controlled device as a programmable switch. The microprocessor may activate and deactivate a corresponding device, and may be programmed and reprogrammed with instructions for operating the device. For example, the device may include any of a variety of actuation mechanisms. In some embodiments, the actuation mechanism includes a pump. For example, in a particular embodiment, the wirelessly controlled device is a wirelessly controlled inflator. The inflator includes an air pump, a hose, a programmable switch electrically coupled to the pump, a transceiver electrically coupled to the programmable switch, and a control device. The hose includes a first end and a second end, the first end connected to the pump, and the second end having a connection mechanism that connects the hose to an inflatable object. For example, the connection mechanism may include a valve. The programmable switch may store instructions that, when executed, activate the pump, such as until a desired pressure setting is reached in the inflatable object. The transceiver may relay pump control information to the programmable switch. The control device may include means for audible or audibly and manually inputting the pump control information. The control device may also include means for visually receiving the pump control information from a user.

Information relayed from the wireless transceiver to the processors and/or memory may include instructions, information for storage in the memory, and/or requests for information stored in the memory and/or output by the processors. For example, in embodiments where the wirelessly controlled device is an inflator, the information may include pump control information. The pump control information may include one or more of a desired pressure setting, an activation signal that turns the pump on, a deactivation signal that turns the pump off, a desired pumping rate that adjusts the speed of the pump, a request for a current pressure level of an object coupled to the hose, or a request for a current pumping rate.

The memory may store various instructions for execution by the one or more processors. For example, the memory and processors may be embodied in a switch for the wirelessly controlled inflator. The instructions, when executed, may instruct information to be transmitted via the wireless transceiver. The information may include any of a variety of information about the pump, such as real-time pressure information, a pumping rate, and/or the pump's operational status (such as on or off, resting, malfunctioning, etc.).

Information for controlling the wirelessly controlled device, such as the inflator, may be sent to the inflator from a control device. The control device may be hardwired to the controlled device, or may wirelessly control the controlled device. Such control devices may include any of a variety of devices and/or features. For example, the control device may include a touch screen. The touch screen may display a graphical user interface that includes icons and information. For example, in inflator embodiments, the touch screen may display one or more icons corresponding to one or more pre-set pressure settings. The icons may convey to a user one or more object types and/or tasks corresponding to the pre-set pressure settings. The control device may store the pre-set pressure settings, or may wirelessly access the pre-set pressure settings stored on the cloud and/or on the programmable switch. For example, the control device may include a software application that is pre-programmed with one or more default pressure settings corresponding to one or more of object types or tasks. A user may update the application by changing the default pressure settings and/or adding new object types and/or tasks. For example, the user may adjust the default pressure settings pre-defined in the application to pre-set settings dictated by the user. The application may include instructions for transmitting the changed settings to the programmable switch and/or automatically updating the programmable switch with the user-set pressure settings.

The remote control device may by physically coupled by a non-communicative means to the wirelessly controlled device. For example, in inflator embodiments, the remote control device may be coupled to a first end of the inflator hose that is opposite a second end of the hose coupled to the inflator pump. In some such embodiments, the remote control device may include a touch screen. The remote control device may also include a battery that powers the remote control device. The battery may be exchangeable and/or rechargeable. In some embodiments, the hose is retractable towards the inflator when extended from the inflator, and the inflator and the remote control device each include one or more corresponding electrical contacts. As the hose retracts from the extended position to a would position, the control device electrical contact engages the inflator electrical contact. Such means may, in some embodiments, be used to charge the remote control device battery by providing power to the remote control device and/or communicate data between the control device and the inflator programmable switch.

The control device may include any of a variety of wireless devices incorporating various user interfaces. Such devices may include smartphones, tablet computers, personal computers, and/or laptops. The control device may also include a plurality of disparate devices wirelessly connected. For example, software and information for wirelessly controlling the wirelessly controlled device may be stored on a cloud-based server, and may be accessed by a device remote from the server through, for example, the internet.

Means may be provided for mounting and/or coupling the wirelessly controlled device to one or more various surfaces. For example, a mounting bracket may be coupled to the wirelessly controlled device. The wirelessly controlled device may be coupled to the mounting bracket so that it may be removed from and/or replaced on the surface. For example, the wirelessly controlled device may be coupled to the mounting bracket by a retractable line such that the wirelessly controlled device is extendable from and retractable towards the surface to which the mounting bracket is mounted.

The wirelessly controlled device may include a housing surrounding at least a portion of the device. The housing may provide protection for the device and/or support for mechanisms associated with the device. For example, the housing may support attachments for the wirelessly controlled device. In some embodiments, the housing supports various control mechanisms that control operation of the device. Such control mechanisms may be in addition to the control device. The control mechanisms may include, in some embodiments, a touchscreen disposed on the housing and electrically coupled to the wirelessly controlled device processors and/or memory. In one embodiment, an inflator is surrounded by a housing, and a touch screen is disposed on the housing and is electrically coupled to the inflator programmable switch.

Various means and/or instructions may be provided that allow a user to interact with and/or control the wirelessly controlled device. For example, a microphone may be provided that communicates with the controlled device processors and/or memory. A camera may also or alternatively be provided that communicates with the controlled device processors and/or memory. In inflator embodiments including a programmable switch, the microphone and/or camera may be in communication with the programmable switch and may be installed on the inflator, such as on a housing surrounding the inflator, or on a device in communication with the programmable switch. The device may be a cloud-based network device.

In embodiments that include a microphone, a cloud-based network device may include instructions that, when executed, receive one or more audio profiles from the microphone, translate the audio into machine-readable instructions, and transmit the machine-readable instructions to the wirelessly controlled device, such as to the inflator programmable switch. In some embodiments, the wirelessly controlled device memory and/or processors may store instructions that, when executed, translate verbal commands into machine-readable commands that can be and/or are executed by the processors. For example, the instructions may include comparing a received audio profile, received either from a local or a remote microphone, to one or more audio profiles stored in the wirelessly controlled device memory. For example, in the inflator embodiment, the audio profiles may correspond to one or more pump operation settings, such as those described above.

In embodiments that include a camera, a cloud-based network device may include instructions that, when executed, receive one or more pictographic profiles from the camera, determine whether the one or more pictographic profiles matches one or more known pictographs associated with machine-readable instructions, and transmit the machine-readable instructions corresponding to the one or more known pictographs matching the one or more pictographic profiles. Alternatively or additionally, the controlled device programmable switch may store instructions that, when executed, compare a received pictographic profile to one or more stored known pictographs corresponding to one or more pump operation settings.

One difficulty in natural language processing for modern smart devices relates to the variety of ways in which a command, request, or other information may be provided. Similar difficulties exist for machine vision. However, these problems may be simplified for various devices with limited functions. For example, an inflator may have a limited variety of commands and requests that can be executed, such as turning on, providing pressure readings, and automatically turning off when a particular pressure is reached for a particular inflatable object. Because of the limited number of tasks that the inflator can execute, the inflator only needs to know a miniscule subset of all the possible natural language and/or visual commands that could otherwise be provided to a general-purpose computer. Example audio profiles of such verbal commands can be stored in the inflator's programmable switch. When a user provides a verbal command, such as "on," the inflator may compare the audio profile of the command to stored audio profiles of various audio commands, and may execute the task associated with the audio profile most closely matching the command. In some implementations, the stored audio profile may comprise an "average" of many different audio profiles of the same command. The programmable switch may store instructions for performing, for example, a least squared difference comparison of a received audio profile to the stored average audio profile. A similar method may be implemented for machine vision. Example pictographs of inflatable objects may be stored in the inflator's programmable switch, including various angles. When a user provides a visual cue to the inflator, such as "showing" the inflator the object to be inflated, the inflator may capture an image of the object and compare it to known pictographs.

In some embodiments, the wirelessly controlled device may communicate with one or more speakers to provide audio feedback to a user. For example, in the inflator embodiment, the one or more speakers may be in communication with the programmable switch via the wireless transceiver. The programmable switch may store instructions that, when executed, provide audible information to a user via the speakers. The audible information may include a current pumping rate, a current pressure, and/or a selected device name, among other information.

The figures described below depict particular embodiments of the apparatus and system described in detail above.

Figure 2:
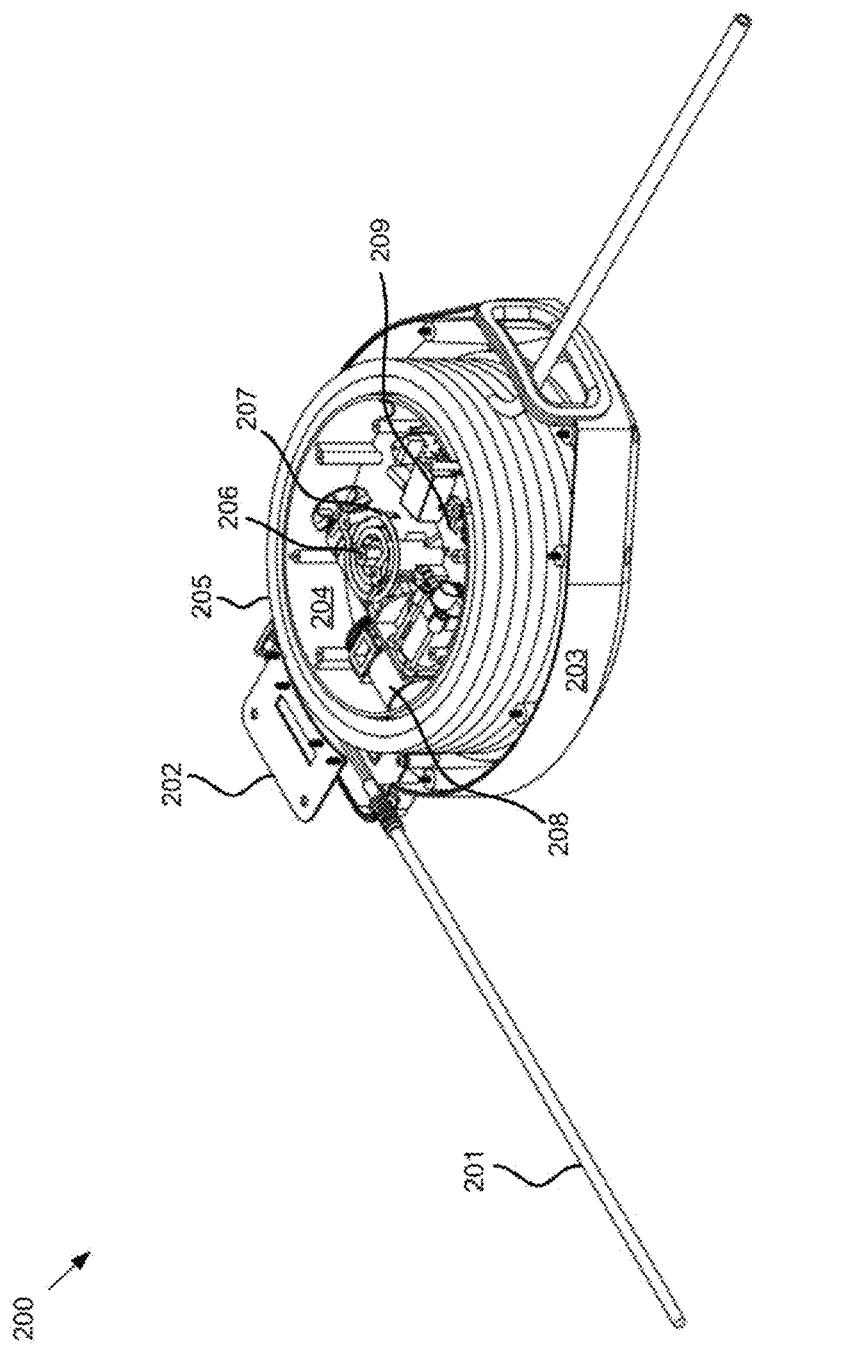
FIG. 2 depicts an isometric view of a wirelessly controlled inflator with a portion of the housing removed to expose various internal components.

FIG. 2 depicts an isometric view of a wirelessly controlled inflator with a portion of the housing removed to expose various internal components. The inflator 200 includes a power cord 201, a mounting bracket 202, housing 203, a rotatable drum 204, an air hose 205, a drum pivot 206, slip rings 207, a pump 208, and a printed circuit board 209. The pump and printed circuit board are fixed to the interior surface of the drum, and thus rotate with the drum as the air hose is wound on, and unwound from, the drum. Electrical wiring running along the portion of the housing removed (not shown) electrically couple the slip rings to the power cord. The slip rings conduct power to the electrical components, such as the pump and the printed circuit board, fixed inside the drum.

Figure 3:
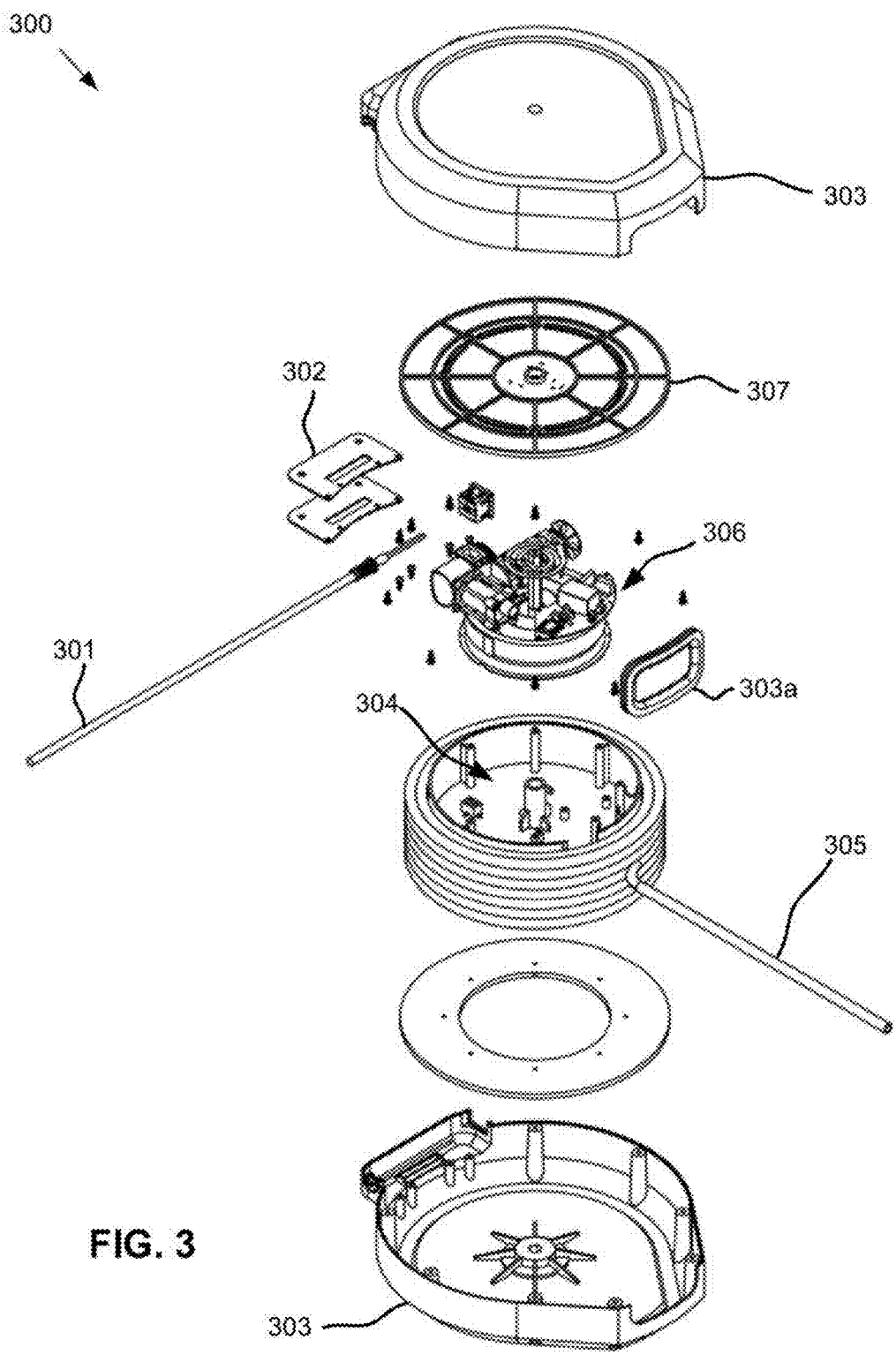
FIG. 3 depicts and exploded view of a wirelessly controlled inflator.

FIG. 3 depicts and exploded view of a wirelessly controlled inflator. The inflator 300 includes a power cord 301, a mounting bracket 302, housing 303 including a hose opening 303a, a rotatable drum 304, an air hose 305, internal drum components 306, and a vented baffle 307. The internal drum components, which include the pump and various electronics, are sealed within the drum by the baffle. Space is provided between the baffle and the housing such that air flows through the hose opening and the baffle to the pump. The structure of the baffle and the housing provide some noise attenuation.

Figure 4:
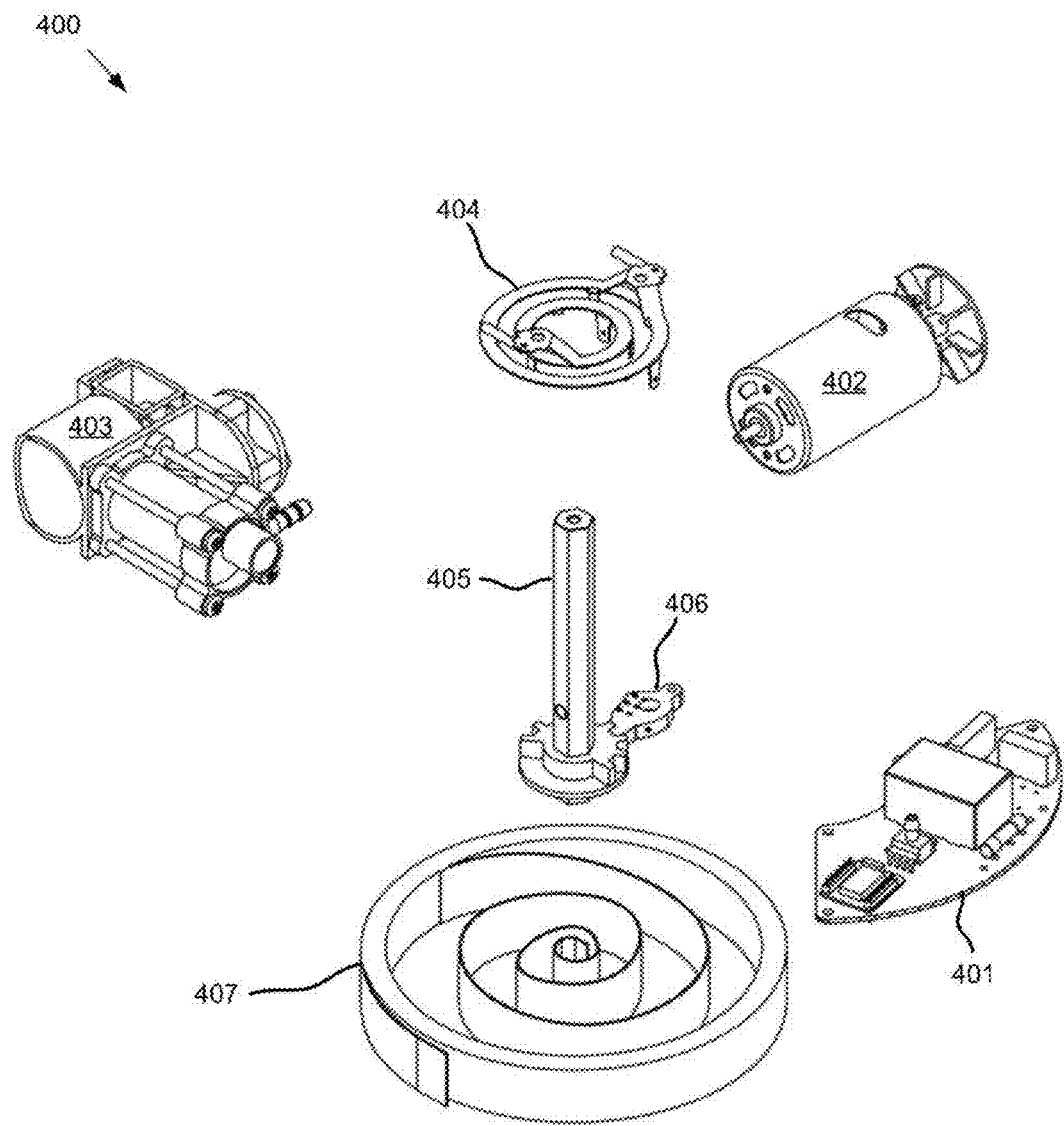
FIG. 4 depicts an exploded view of various internal components of a wirelessly controlled inflator.

FIG. 4 depicts an exploded view of various internal components of a wirelessly controlled inflator. The inflator 400 includes a printed circuit board 401, a motor 402, a pump 403, slip rings 404, a drum pivot 405, a pawl mechanism 406, and a recoil spring 407. The slip rings provide power to the printed circuit board and the motor. The motor drives the pump. The recoil spring is fixed at one end to the drum pivot and at the other end to the drum, and enables the drum to rewind the hose. The pawl mechanism fixes the drum and prevents the spring from recoiling. As used herein, "recoil" refers to a return to a state of equilibrium of a spring, either from compression, expansion, coiling, or uncoiling.

Figure 5:
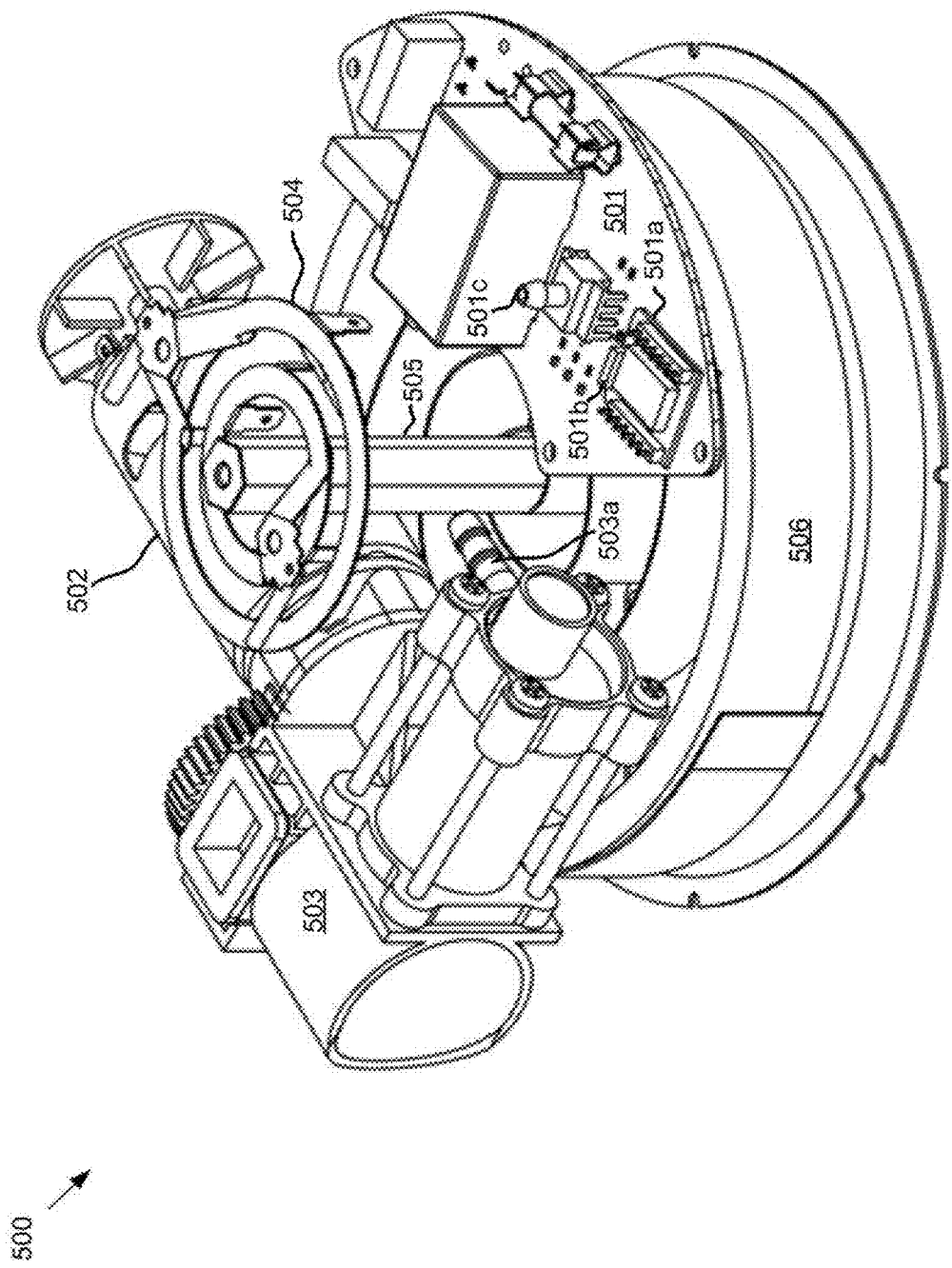
FIG. 5 depicts an assembled view of various internal components of a wirelessly controlled inflator.

FIG. 5 depicts an assembled view of various internal components of a wirelessly controlled inflator. The inflator 500 includes a printed circuit board 501 having a programmable switch 501a and a wireless transceiver 501b, a pressure sensor 501c, a motor 502, a pump 503, a hose barb adaptor 503a, slip rings 504, a drum pivot 505, and a recoil spring 506. A hose couples to the pump via the barb adaptor, then to a t-connector (not shown), which couples to another hose and the pressure sensor. The second hose wraps around the drum within which the depicted components are disposed.

Figure 6:
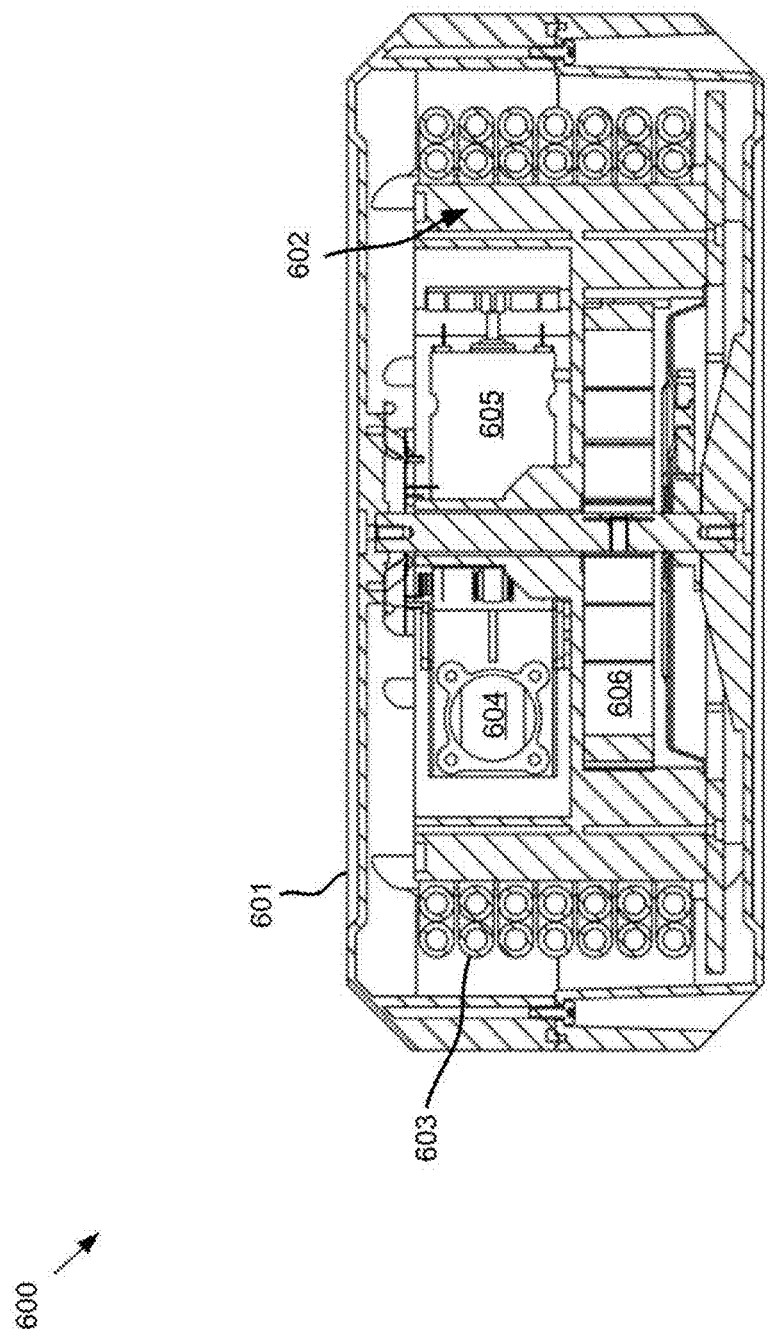
FIG. 6 depicts a cross-sectional view of a wirelessly controlled inflator.

FIG. 6 depicts a cross-sectional view of a wirelessly controlled inflator. The inflator 600 includes housing 601, a drum 602, a hose 603, a pump 604, a motor 605, and a recoil spring 606. The housing surrounds the drum, hose, pump, motor, and recoil spring, and the hose extends from the drum through the housing similar to that described above.

Figure 7A:
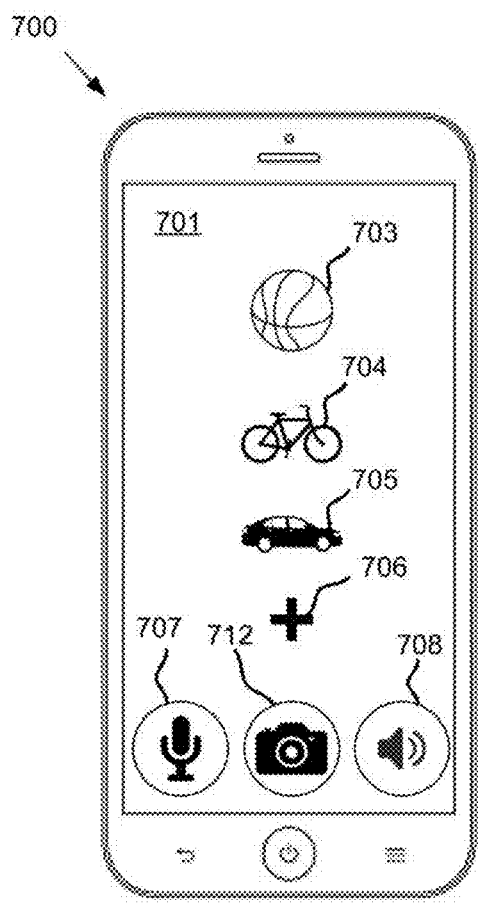
FIGS. 7A-B depict views of a smartphone running an application that controls a wirelessly controlled inflator.
Figure 7B:
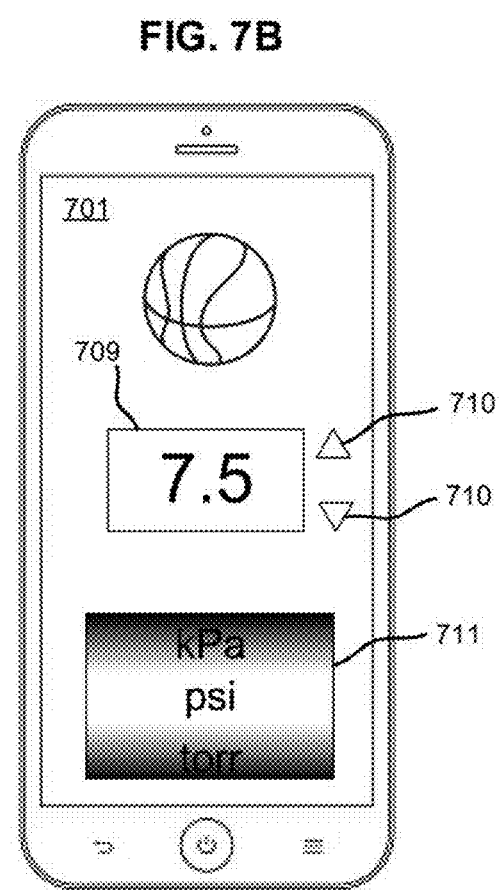

FIGS. 7A-B depict views of a smartphone running an application that controls a wirelessly controlled inflator. The smartphone 700 includes a touchscreen 701 that displays to a user a graphical user interface that allows a user to interact with the application software and control the inflator. The graphical user interface includes object icons 703, 704 and 705, add-object icon 706, voice command icon 707, audio feedback icon 708, current pressure setting 709, adjust pressure icons 710, pressure units 711, and visual command icon 712. The object icons indicate to a user various objects for which the application has stored, either on the smartphone, in the cloud, or on the inflator's programmable switch, various pre-set and/or default pressure settings. The user may touch the screen over the object icons to select that object and adjust the pressure setting and/or units. The application may automatically adjust the numerical value of the pressure setting based on the selected units. The user may touch the screen over the add object icon to add a pre-set pressure for a new object. The user may touch the screen over the voice command icon to provide verbal instructions, such as those described above, to the inflator. The user may touch the screen over the audio feedback icon to receive audible information, via speaker, from the inflator. Another screen (not shown) may allow the user to select which information the inflator is to audibly provide. Alternatively, the application software may store pre-set instructions for providing audible feedback. For example, a user may press the audio feedback icon, and the application may instruct the programmable switch to provide the user, via a speaker, with the current pressure at whole-unit intervals. Or, the switch may provide the user with an audible signal when an object is done being inflated, or when a desired pressure, such as a pre-set pressure, is reached. The visual command icon allows the user to capture an image of an object to be inflated using a camera on the smartphone (camera not shown). The control device may compare the image to stored images, or may transmit the image to the cloud to be processed, and may, based on the processing, set a pressure for the object based on known pressures associated with that object.

FIGS. 8A-B depict views of a smartphone running an application that controls a wirelessly controlled inflator. The smartphone 800 includes a touchscreen 801 that displays to a user a graphical user interface that allows the user to interact with the application software and control the inflator. The graphical user interface includes and ON/OFF switch 802, current pressure indicator 803, and target pressure indicator 804. The target pressure may correspond with a pre-set and/or default pressure, or may be set on-the-fly by the user.

FIGS. 9A-B depict two views of and alternative embodiment of a control device for a wirelessly controlled inflator. The inflator 900 includes a hose 901, a wireless remote control device 902, and electrical contacts 903. The remote control device is affixed to the hose by coupling members 904. The control device also includes a camera 905 for receiving visual commands. The hose includes a connection mechanism 906, which may include a valve in some embodiments. The remote control device includes a touch screen that displays to a user a graphical user interface that allows the user to interact with the application software and control the inflator. The remote communicates wirelessly with the inflator, either via a cloud-based network of devices, or directly. The remote may also communicate data with the inflator via the electrical contacts, which may also provide power to the remote via the inflator.

Figure 10:
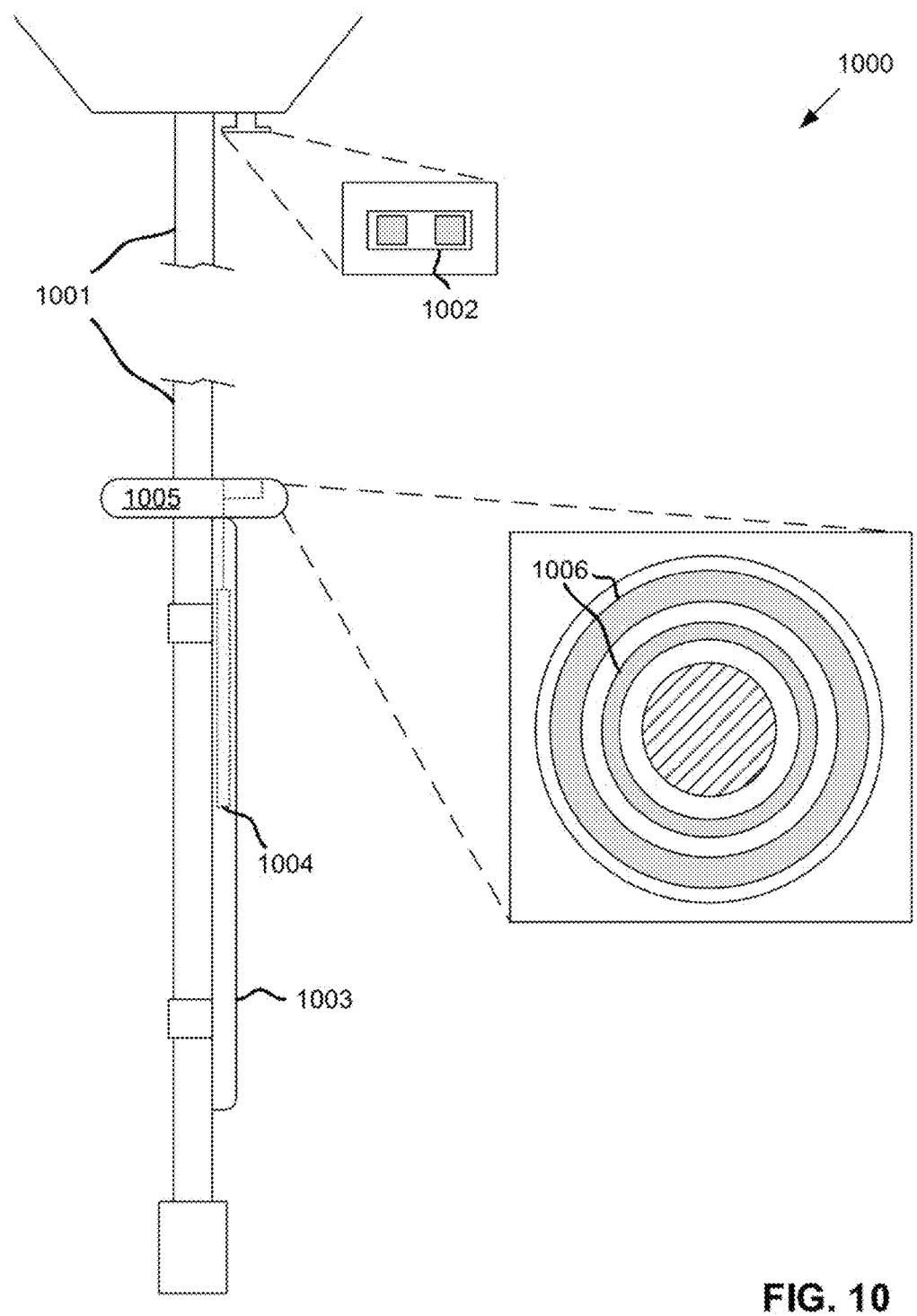
FIG. 10 depicts an alternative embodiment of a control device for a wirelessly controlled inflator.

FIG. 10 depicts an alternative embodiment of a control device for a wirelessly controlled inflator. The inflator 1000 includes a hose 1001, an electrical contact 1002, a wireless remote control device 1003 having a battery 1004, and a hose stop 1005 having slip rings 1006. As the hose retracts towards the inflator, the electrical contact contacts the slip rings, thereby allowing power and/or data to be transferred between the inflator and the remote control device.

Figure 11:
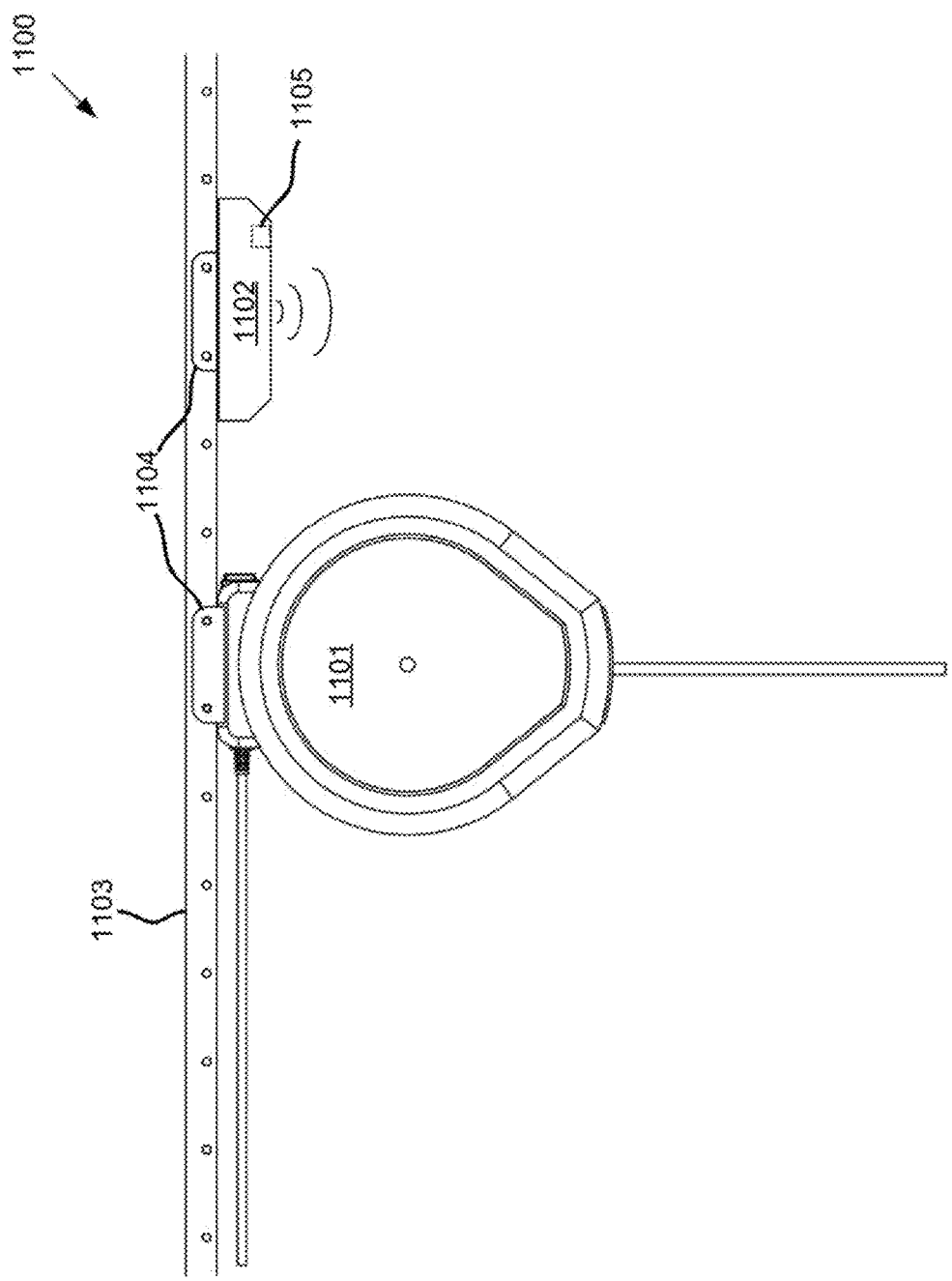
FIG. 11 depicts a mounted wirelessly controlled inflator and a corresponding networked device.

FIG. 11 depicts a mounted wirelessly controlled inflator and a corresponding networked device. The system 1100 includes a wirelessly controlled inflator 1101, a wirelessly controlled speaker 1102, a mounting track 1103, and universal mounting brackets 1104. The wirelessly controlled speaker also includes a camera 1105 for capturing visual commands. The mounting track may allow the inflator and the speaker to be mounted, via the universal mounting brackets, to a ceiling or other overhead surface. Though the inflator and speaker may not be placed at a convenient reaching height, both devices may be wirelessly controlled, as is described above.

Figure 12:
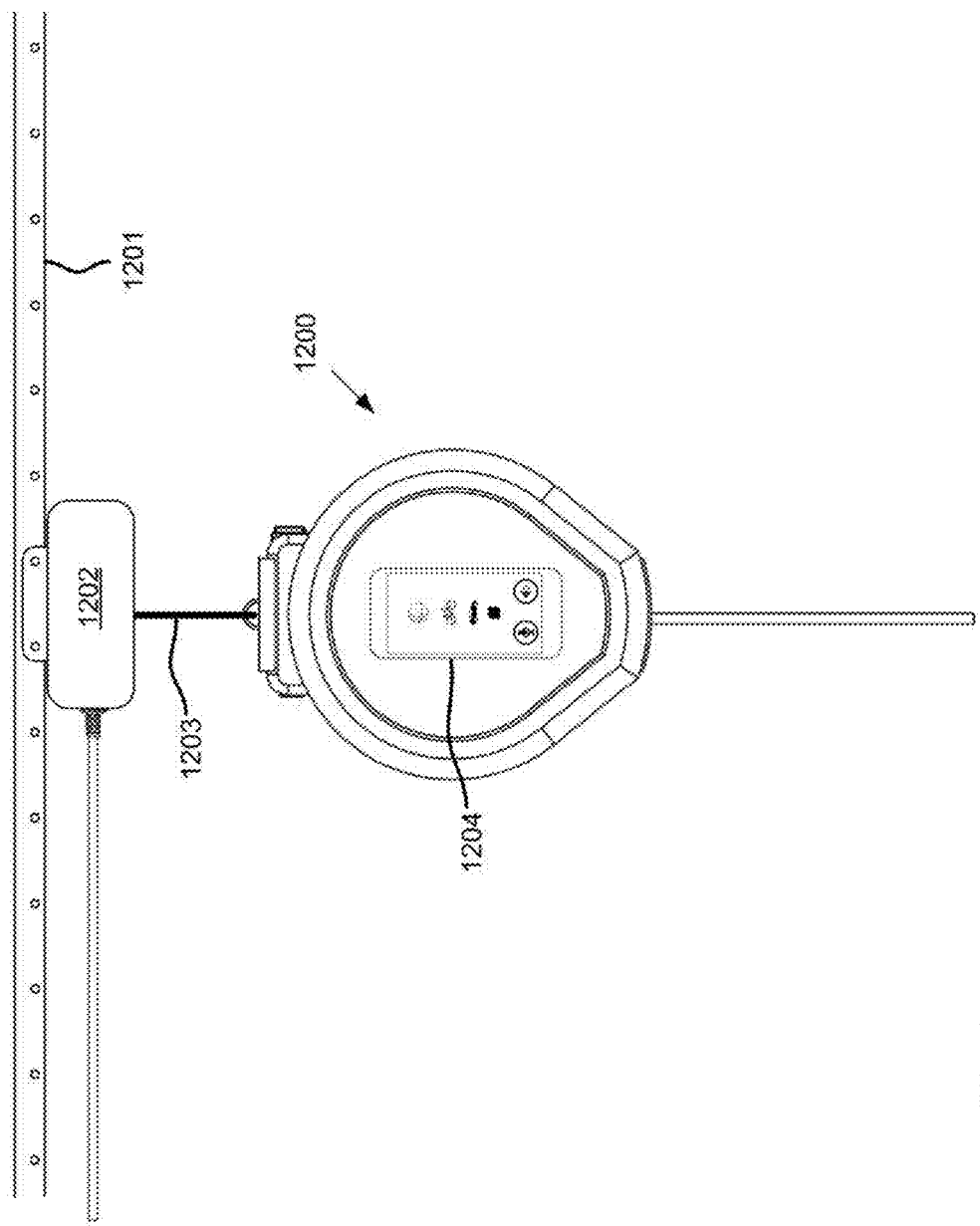
FIG. 12 depicts an alternative embodiment of a wirelessly controlled inflator.

FIG. 12 depicts an alternative embodiment of a wirelessly controlled inflator. The wirelessly controlled inflator 1200 is mounted to the mounting track 1201 by a motorized lifting device 1202. The motorized lifting device is coupled to the inflator by a line 1203, which may provide support and/or power to the inflator. The inflator may also/alternatively be battery-powered. The inflator also includes a touch screen control device 1204 incorporated into the inflator housing. The control device may be removable, or may be integrated into the inflator housing. The control device may directly power the inflator's motor via electrical contacts in the housing. Alternatively, such as when the control device is removable, the inflator may include a separate programmable switch for the motor that is wirelessly connected to the control device.

We claim:

1. A wirelessly controlled inflator, comprising:
   an air pump;
   a hose comprising a first end and a second end, the first end connected to the pump, and the second end comprising a connection mechanism that connects the hose to an inflatable object;
   a programmable switch electrically coupled to the pump, the programmable switch storing instructions that, when executed, activate the pump until a desired pressure is reached in the inflatable object;
   a transceiver electrically coupled to the programmable switch, wherein the transceiver relays pump control information to the programmable switch, wherein the control information comprises a desired pumping rate; and
   a control device comprising a camera, at least one image of at least one inflatable object, a pressure setting for the inflatable object, and instructions, executable by one or more of the control device, the air pump, and the programmable switch, to inflate the inflatable object to the pressure setting upon receiving, via the camera, a picture and determining the picture matches the image of the inflatable object.

2. The wirelessly controlled inflator of claim 1, wherein the control information comprises one or more of the desired pressure, an activation signal, a deactivation signal, a desired pumping rate, a request for a current pressure level of an object coupled to the hose, or a request for a current pumping rate.

3. The wirelessly controlled inflator of claim 1, wherein the switch stores instructions that, when executed, transmit information via the wireless transceiver, the information comprising one or more of real-time pressure information, pumping rate, or pump operational status.

4. The wirelessly controlled inflator of claim 1, wherein the transceiver is wireless, and wherein the control device communicates wirelessly with the transceiver.

5. The wirelessly controlled inflator of claim 1, wherein the connection mechanism comprises a valve.

6. The wirelessly controlled inflator of claim 1, wherein the control device comprises a touch screen, and wherein the touch screen displays one or more icons corresponding to one or more pre-set pressure settings, the icons conveying to a user one or more of object types or tasks corresponding to the pre-set pressure settings.

7. The wirelessly controlled inflator of claim 1, wherein the control device stores one or more default pressure settings corresponding to one or more of object types or tasks.

8. The wirelessly controlled inflator of claim 7, wherein the control device stores instructions that, when executed, allow a user to adjust the default pressure settings to pre-set pressure settings.

9. The wirelessly controlled inflator of claim 1, wherein the control device comprises a touch screen, and wherein the control device is coupled to the second end of the hose adjacent to the universal coupling mechanism.

10. The wirelessly controlled inflator of claim 9, wherein the control device comprises a battery that powers the control device.

11. The wirelessly controlled inflator of claim 10, wherein the hose is retractable, and wherein the inflator and the control device each further comprise one or more electrical contacts, wherein, as the hose retracts from an extended position to a wound position, the control device electrical contact engages the inflator electrical contact.

12. The wirelessly controlled inflator of claim 11, wherein the inflator provides one or more of power or data to the control device via the electrical contacts.

13. The wirelessly controlled inflator of claim 1, wherein the control device comprises one or more of a smartphone, a tablet, a personal computer, or a cloud-based server.

14. The wirelessly controlled inflator of claim 1, further comprising a housing surrounding the inflator, a touch screen disposed on the housing and electrically coupled to the programmable switch.

15. The wirelessly controlled inflator of claim 1, wherein the control device comprises means for visually receiving the pump control information.

16. The wirelessly controlled inflator of claim 15, wherein the control device communicates with the transceiver via a cloud-based network device, wherein the cloud-based network device stores instruction that, when executed,
- receive one or more pictographic profiles from the control device;
- determine whether the one or more pictographic profiles matches one or more known pictographs associated with machine-readable instructions; and
- transmit the machine-readable instructions corresponding to the one or more known pictographs matching the one or more pictographic profiles.

17. The wirelessly controlled inflator of claim 15, wherein the programmable switch stores instructions that, when executed, compare a received pictographic profile to one or more stored known pictographs corresponding to one or more pump operation settings.

18. The wirelessly controlled inflator of claim 1, wherein the control device communicates with the transceiver via a cloud-based network device, wherein the cloud-based network device stores instructions that, when executed,
- receive one or more audio profiles from the control device;
- translate the audio into machine-readable instructions; and
- transmit the machine-readable instructions to the programmable switch.

19. The wirelessly controlled inflator of claim 1, wherein the programmable switch stores instructions that, when executed, compare a received audio profile to one or more stored audio profiles corresponding to one or more pump operation settings.

20. The wirelessly controlled inflator of claim 1, further comprising one or more speakers in communication with the programmable switch, and wherein the programmable switch stores instructions that, when executed, provide audible information to a user via the one or more speakers.

* * * * *